United States Patent

Rotter et al.

[11] Patent Number: 6,134,496
[45] Date of Patent: Oct. 17, 2000

[54] PROCESS FOR CONTROLLING THE SHIFTING PROCESS OF AN AUTOMATIC VEHICLE GEAR, AND CONTROL DEVICE

[75] Inventors: Erwin Rotter, Nattheim; Thomas Schönhaar, Könisbronn; Wilfried Maier; Friedrich Häberle, both of Heidenheim; Herbert Depping, Giengen, all of Germany

[73] Assignee: Voith Turbo GmbH & Co. K.G., Germany

[21] Appl. No.: 08/927,300

[22] Filed: Sep. 11, 1997

[30] Foreign Application Priority Data

Sep. 18, 1996 [DE] Germany .............. 196 38 077

[51] Int. Cl.$^7$ .................................................. G06F 17/00
[52] U.S. Cl. .................. 701/56; 701/51; 701/55; 701/68
[58] Field of Search ........................ 701/51, 53, 55, 701/56, 60, 61, 66, 67, 68; 477/130, 155, 86, 68, 163; 73/866

[56] References Cited

U.S. PATENT DOCUMENTS

| 5,063,814 | 11/1991 | Baba et al. ............................. 701/62 |
| 5,191,527 | 3/1993 | Asahara et al. ......................... 701/60 |
| 5,195,035 | 3/1993 | Asahara et al. ......................... 701/60 |
| 5,213,013 | 5/1993 | Fujiwara et al. ....................... 477/161 |
| 5,301,572 | 4/1994 | Tanaka .................................. 477/161 |
| 5,612,874 | 3/1997 | Schulz et al. ........................... 701/51 |
| 5,674,155 | 10/1997 | Otto et al. ............................. 477/176 |
| 5,679,091 | 10/1997 | Salecker et al. ......................... 477/86 |
| 5,890,992 | 4/1999 | Salecker et al. ......................... 477/86 |
| 5,902,213 | 5/1999 | Tsutsui et al. ......................... 477/155 |

FOREIGN PATENT DOCUMENTS

| 0 176 750 | 8/1985 | European Pat. Off. . |
| 0414547 | 2/1991 | European Pat. Off. . |
| 0 435 372 | 7/1991 | European Pat. Off. . |
| 0780602 | 6/1997 | European Pat. Off. . |
| 19 32 986 | 6/1969 | Germany . |
| 30 25 054 | 7/1981 | Germany . |
| 32 05 767 | 2/1982 | Germany . |
| 04095658A | 3/1992 | Japan . |
| WO97/084 79 | 3/1997 | WIPO . |

*Primary Examiner*—Jacques H. Louis-Jacques
*Attorney, Agent, or Firm*—George Pappas

[57] ABSTRACT

The invention relates to a process for the control of the shifting process of a vehicle with electro-hydraulically actuatable friction elements for the shifting-over between different transmission stages in a vehicle with at least in addition a drive engine in which a current actual value is determined for at least one magnitude characterizing the shift process in each shifting process; the actual value is compared with an establishable and/or storable desired value; on deviation of the actual value from the desired value, the control pressure for the at least indirect influencing of the magnitude characterizing the switching process is adaptively changed by a determinable, calculatable or prescribable first correction value for the achieving of an optimal shifting behavior and the course of the altered magnitude is storable in each case as new characteristic curve of the desired values. The invention is characterized by the following features: in at least the shifting processes in which through a further adaption no satisfactory shifting courses can any longer be insured, at least one actual value—the drive turning rate—is determined for a magnitude characterizing the acceleration of the turning rate to be synchronized in force-flow direction in the drive line on the input side of the coupling at a time point after the beginning of the synchronizing process; the actual value either of the acceleration of the turning rate to be synchronized or of a magnitude at least indirectly characterizing the acceleration of the turning rate to be synchronized, or that of the turning rate to be synchronized, is compared with a desired value; on deviation of the actual value from the desired value the control pressure is altered by a second correction value until the desired value course of the turning rate to be synchronized is set in, and, moreover, the course of the control pressure characteristic curve is replicated at higher pressures.

35 Claims, 3 Drawing Sheets

FIG.2a

PROCESS FOR CONTROLLING THE SHIFTING PROCESS OF AN AUTOMATIC VEHICLE GEAR, AND CONTROL DEVICE

TECHNICAL FIELD

The invention relates to a process for controlling the switching process of an automatic vehicle gear.

BACKGROUND OF THE INVENTION

Processes for the operating or for the control of automatic vehicle gears are known already from the following publications:

(1) DE 19 32 966 C3
(2) DE 32 05 767 C2
(3) EP 0 176 750 B2
(4) EP 0 435 372 B1
(5) DE 30 25 054 A1

It is a known practice in automatic vehicle gears to adjust the pressure of the working medium, which serves for the actuation of the friction elements of the gear, in dependence on various operating parameters of the motor vehicle. In the process disclosed in DE 19 32 966 C3, the pressure adjustment occurs via an electronic control over predetermined pressure characteristic curves. A compensation for parameter changes in consequence of series scatterings or aging effects cannot thereby be achieved. Friction values of lamellae, characteristic curves of pressure regulators or springs as well as the moment given off by the motor, however, are constantly subject to these scatterings, whereby, on the one hand, shift quality fluctuations are evoked, but, on the other hand, high demands are placed on the tolerances of the parts used or employed. This works out very unfavorably in respect to costs.

In the mode of execution disclosed in DE 32 05 767 C2, therefore, closed regulating circuits were used. These have the disadvantage, however, that a regulating magnitude taking the necessary dynamics into account is required. Basically, in the regulating stretch motor-to-gear, in consequence of the down times present, stability problems are to be expected in the entire operating line, and for this reason clear regulating deviations have to be accepted into the bargain before the regulation can engage with correcting effect, which results in a poor shifting comfort.

From DE 30 25 054 A1 there is known a pressure regulator for an automatic gear control for vehicles, in which for the gear shifting in dependence on the load, a desired shifting time is set. The actually occurring shifting time is measured and compared with the stored desired shafting time. If deviations arise here, a correction value is deposited in a correction register which, in a shifting of gears, is added to the pressure characteristic curves which are deposited originally in a storage and serve the purpose of controlling the pressure during the gear change.

In a process for the electronic control of an automatic vehicle gear such as is described in EP 0 176 750 B2, correction values are calculated and deposited in dependence on the load and turning rate, so that there can occur an exact adaptation to different load/turning rate ratios. The desired and the actual values for the characterizing magnitude as well as the correction values formed are deposited in load turning rate fields, in which the actual values are formed by mean-value formation of individual values from several shifting processes, so that until the conclusion of the mean-value formation the previous correction value remains preserved and after execution of the correction the actual values are set to the desired values for the mean-value formation, by alteration of the correction value.

In EP 0 435 372 B1 there is described a process for the control of the change, in an automatic gear of a vehicle, from a reduced-torque transmitting fluid-pressure driven torque transmission device, which is allocated to a lower speed ratio, to a fluid-pressure torque transmission arrangement, which is allocated to an increasing torque-transmitting fluid pressure driven torque transmission arrangement which is assigned to a higher speed ratio when the motor choke is substantially closed. The off-going torque transfer device there is brought out of engagement simultaneously or substantially simultaneously with the engagement of the up-coming torque transfer device. The gear has an input, an output and a turbine which is coupled over the input with the drive machine. The process described in this publication comprises the steps mentioned in the following.

The filling pressure is applied to the up-coming torque transmission device for a filling time, in order substantially to fill the upcoming torque transmission device with operating fluid. The turbine speed increase is detected by reason of an initial slippage of the torque transfer device transmitting less torque, a synchronization of the upcoming torque transmission device on the basis of the turbine speed and the starting speed is established, and the change is completed when a synchronization is proved. There, on the off-going torque transmitting device for a time span shorter than the filling time, a lower pressure is applied and then the off-going torque transfer arrangement is emptied of operating fluid. If a turbine speed increase is detected, there takes place a run-through of a control loop. In this run-through a slippage profile is set up, which represents the desired slippage during the run-through. The slippage of the upcoming torque transfer device is measured and controlled, in order to control the slippage of the upcoming torque transfer device on the basis of the slippage speed profile.

In all these forms of executions for the influencing of the shifting courses, especially of the shifting times, by influencing the control pressure for action, for example, on the lamellae, it is known to adapt this pressure adaptively to the concrete circumstances and to adjust it. In automatic gears, despite influencing the control or regulating pressure in dependence on the ascertained travelling characteristic values, in respect to the quality only partially satisfactory shifting results are achieved, which arise sporadically in shiftings.

BRIEF SUMMARY OF THE INVENTION

Underlying the invention, therefore, is the problem of further developing a process for controlling the shifting of an automatic vehicle gear and, further, of developing a control device for the execution of this process, in such manner that the disadvantages mentioned are avoided. Especially, the sometimes occurring unsatisfactory switching courses are to be corrected with simple means and low constructive expenditure. In particular there is to be achieved a compensation of parameter changes in consequence of series scatterings or aging effects, for example of the friction values of lamellae, of the characteristic curves of pressure regulators or springs, as well as of the moment given off by the motor. Disturbance variables that bring about a clear regulating deviation which results in a poor shifting comfort are to be avoided. The problem lies further in improving the adaptive behavior of the shifting courses, especially of the shifting times, by influencing the control pressure for acting, for example, on the lamellae, and the unsatisfactory shifting results arising there, in such manner that the shifting comfort can be improved.

According to the invention a control system that adaptively influences characteristic pressure values—the initial pressure or, for example, the regulating pressure—is combined with a regulation superposed on this. The inventor has perceived that the individual shifting processes, in part very unsatisfactory by reason of disturbances, are conditioned by external influences, for example by friction, and also by dynamic processes in the drive line at lower pressures. This has the consequence that the turning rates to be synchronized, i.e. the input turning rate lying on the gear input or on the primary side of the coupling, which is designated in the following as drive turning rate, and is mostly the motor turning rate or a turning rate proportional to the motor turning rate, is adapted more slowly to the output turning rate lying on the secondary side of the coupling, which is designated as off-drive turning rate, and the synchronous turning rate is achieved at a later point of time. The entire shifting process therefore is lengthened.

The regulation superposed on the adaption brings about an adaptation of the acceleration of the turning rate to be synchronized on the drive side to a desired value, by the driving of a setting member which generates the control pressure for the actuation at the coupling point. The increase or decrease of the control pressure resulting from the adapted characteristic curve for the control pressure course brings about a rapid adaptation of the turning rate to be synchronized. The control pressure—initial control pressure or regulating pressure—is raised there by a certain value. The control pressure characteristic curve course with the superposed regulation, is then replicated with adaptive influencing, but with higher pressure values. The superposed regulation becomes active as a rule only when the possibilities of adaption are exhausted, i.e. when optimal control pressure courses already adaptive for the individual switching processes have already been determined and set in, or when the further adaptive change of the control pressure courses would no longer insure any optimal shifting courses with respect to the times to be achieved.

Cases are also thinkable in which the superposed regulation is already previously activated. For example, when in the time duration TMAX (maximal shifting duration) a synchronization is not possible.

The regulation operates essentially at two magnitudes at least, a current actual value of a magnitude that characterizes, indirectly at least, the acceleration of the turning rate to be synchronized, and a desired value of this magnitude which is preferably the drive turning rate itself, in which the acceleration can be determined over time from the turning rate. The output value of the regulation is a change of the control pressure acting on the lamellae of the coupling. As setting member there functions a control pressure generation unit. Within the regulating stretch there occurs a steady compensation for the actually determined acceleration of the drive turning rate, or for the drive turning rate itself, with respect to a drive turning rate course determined theoretically, and with corresponding control pressure course. This can be already established and stored for individual shifting processes or else it is calculated during the shifting process.

On deviation, a setting signal is issued for the control pressure influencing, especially for its increase. Preferably this increase occurs by an establishable or predictable increase value. This establishable or predictable increase value can likewise be stored already as a fixed value or as a variable magnitude.

In regard to the apparatus, the gear control has for this a control device which comprises, besides the control arrangement for the adaption, a regulating arrangement, preferably in the form or an electronic control and regulating unit. Into this there is integrated a comparator. The comparator can be realized by routines running off in the control and regulating unit. By the comparator, for example, desired values deposited there in the form of characteristic curves for theoretical drive turning rate courses during a shifting process are compared with the actual values. The comparison can extend also to an assignable desired value range. Another possibility lies in calculating the desired motor turning rate course, or the motor acceleration, i.e. the acceleration of the turning ratio be achieved by synchronization, from the still remaining shifting time. The shifting time is given there by the maximal loading of the lamellae.

In the adaption it can be a matter, for example, of a regulating pressure value adaption known from the state of the art and briefly explained initially, or else of a so-called initial pressure value adaption. In the initial pressure value adaption, on nonobservance of a definite prescribable time for the beginning of the synchronizing process, or on nonobservance of a defined motor turning rate change of the initial pressure value for the bringing-up of the required pressure force for the coupling parts couplable with one another by force closure, the adaption is performed. With these, as a rule mechanically transferring, asynchonously switchable couplings, at least two friction surfaces are pressed against one another, whereby there arises a friction required for the torque transmission. For the friction surfaces themselves various geometric basic forms come into consideration, for example friction disks, cone and drum couplings or else several friction bodies in parallel circuit, for example of the lamella type couplings are used. The torque transmittable in these couplings operating in force closure by friction, besides depending on the contact pressure, depends there essentially on the friction magnitude as well as on the number of friction-surface pairs. In the shifting process with asynchonously shiftable friction coupling, the primary and secondary sides, i.e. drive and off-drive sides of the coupling, are joined with one another over friction surfaces. Since the friction coefficient u changes substantially during the slip process in consequence of lubricant action and of warming, the course of the torque theoretically to be expected in practice does not occur. This theoretical torque serves, however as a basis for the approximated calculation of slip time and friction work. The slip moment of the coupling acts as acceleration moment and must also bring up the possibly already acting useful moment. Since the friction work required in the shifting process is transformed substantially also into thermal energy and therewith leads to the heating of the coupling, and so that the friction surfaces not be destroyed as a consequence of the arising temperatures, limit values are prescribed for the duration of the slip time at certain turning rates for each coupling type and size. Too long a slip time results in an increased load of the friction elements, which leads to an increased wearing down and to an increased need for starting force. With the influencing of the initial pressure value there occurs an influencing of the time for the setting-in of the regulating pressure value and therewith also of the time up to the beginning of the synchronizing process. In the first-time operation preferably for the first circuits ca. twice as many pressure correction values are used. This insures a rapid adaptation of the circuit pressure course to the vehicle and the traveling conditions. The correction values themselves there can be stored in the RAM (random access memory) or, in the case of greater deviations from the actually stored values, also in the EEPROM (electrically erasable read only memory). This means that also after switching-off of the ignition the last pressure correction values remain preserved. Further, there exists the possibility in case of errors in the sensory system, for example in the turning rate sensor or load-giver, of blocking the adaption. The shifting can then be carried out with the control pressure recognition fields deposited in the EEPROM. The possibility explained here for the adaption of the initial pressure values is a selected one. Other possibilities for the adaption of the initial pressure values are likewise thinkable.

BRIEF DESCRIPTION OF THE DRAWINGS

The solution according to the invention is explained in the following with the aid of figures. In these there is represented in detail the following:

FIG. 1, comprising of FIGS. 1a to 1c, explain with the aid of an example for a back-switching, in characteristic curves, the actual courses of the turning rate to be synchronized on the drive side and of the control pressure with use of the regulation according to the invention, and in dot-and-dashed representation, the possible course of the turning rate to be synchronized on the drive side and of the control pressure in correspondence to the state of the art;

Figure 1A:
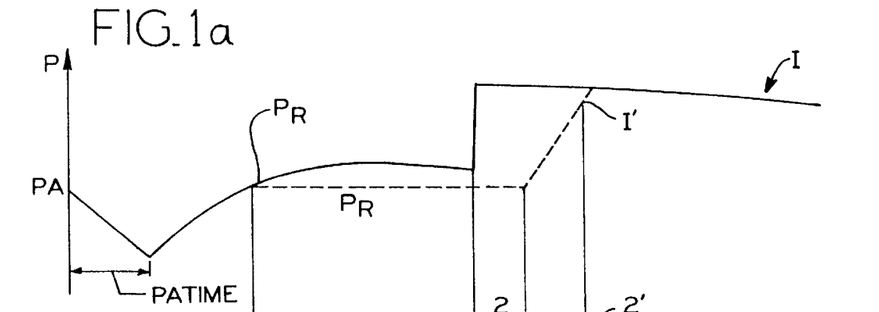
Figure 1B:
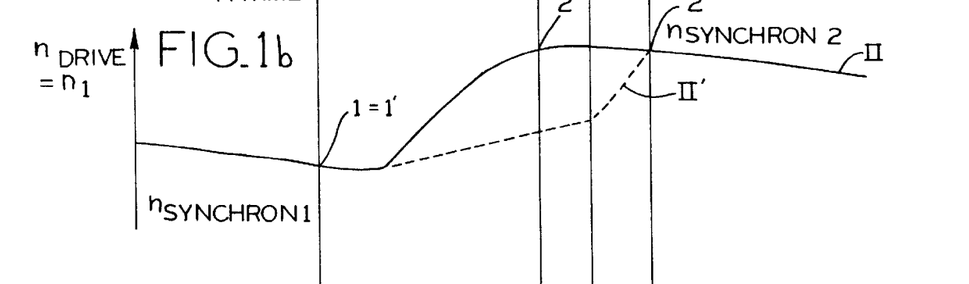
Figure 1C:
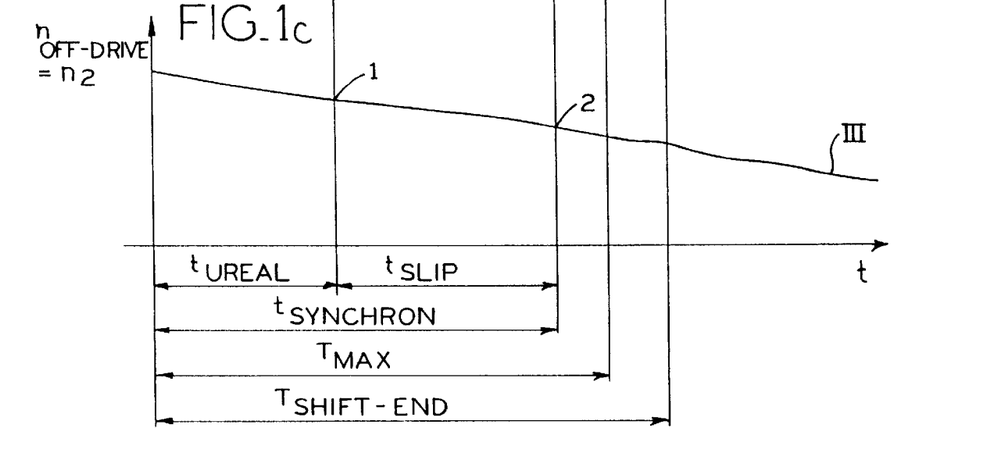

FIGS. 1a to 1c clarify, contrasting with each other, the switching behavior with the aid of curves characterizing the shifting. In detail these are a control pressure characteristic curve I, a characteristic curve II of the course of the turning rate $n_1$ lying on the drive side and to be synchronized, and a characteristic curve III in which the course of the off-drive turning rate $n_2$ is represented. Control pressure, turning rate to be synchronized and drive turning rate are plotted in each case over time. For clarification of the switching behavior and of the individual characteristic curve courses, these are arranged one under another.

The individually represented values in the drawings are designated as follows:

| | |
|---|---|
| $P_{max}$ or USTELLMAX | = maximal operating pressure |
| PR | = calculated regulating pressure |
| PA | = initial print value |
| PATIME | = time in which the initial pressure value rises or falls to the regulating pressure value |
| TMAX | = time after which safety pressure run-up begins and after expiration of which the synchronizing process should be concluded |
| TSCHALT-ENDE | = time after which operating pressure sets in |

For the switching process, further, the following measuring and regulating magnitudes in the drawings are essential:

| | |
|---|---|
| $n_{synchron\,1}$ | = drive turning rate, as a rule motor turning rate at beginning of switching process |
| $n_{syncrhon\,2}$ | = drive turning rate, as a rule motor turning rate after termination of the switching process |
| $t_{ureal}$ | = time up to beginning of the synchronizing process |
| $t_{slip}$ | = slip time of the lamellae |
| $t_{synchron}$ | = time after the switching process was concluded |

DETAILED DESCRIPTION OF THE INVENTION

From FIGS. 1a to 1c there are to be seen also schematically the problems possibly arising in a conventional adaptive influencing of a back-switching with the aid of their switching characteristic curves, which are here designated in each case with I', II' and III' and which are represented dot-and-dashed opposite the switching courses with the superposed regulation according to the invention. In detail, to that end, the control pressure course p, the turning rates to be synchronized—the input turning rate or, with respect to the force transmission in the drive line, the drive turning rate $n_1$—and the output turning rate, i.e. the off-drive turning rate $n_2$, are plotted over the time t in one diagram. By drive turning rate $n_1$ there is meant in the following either the turning rate at the gear input, which corresponds directly to the motor turning rate, or a turning rate proportional to the motor turning rate. This turning rate, therefore, can be designated as input turning rate.

From the diagram in FIGS. 1b and 1c it is to be learned that after the arising of a gear shift signal the motor turning rate or the drive turning rate $n_1$ still remains essentially unchanged until the reaching of a freewheeling point, here the point 1' for the only purely adaptive influencing, by which there is meant the point at which the friction elements allocated to the new gear take over the full moment and release the friction elements allocated to the old gear. From this freewheeling point the motor turning rate $n_1$ begins to climb, while simultaneously the friction elements grind. The time up to the reaching of this freewheeling point that indicates the beginning of the synchronization process is designated with $t_{UREAL}$. Upon this there follows the slip time of the friction elements $t_{SLIP}$. At the point 2' in the diagram the two friction elements run synchronously, the new gear is laid-in, the friction elements adhere.

The desired value to be observed for the shifting process is, in the case of a so-called regulating pressure value adaption, for example, the slip time $t_{SLIP}$, the time up to the termination of the shifting process $t_{sychronous}$ and/or the time after which the operating pressure TSCHALT-ENDE ($t_{SHIFT\,END}$) is present. The setting magnitude for the influencing of this span of time is the regulating pressure value PR. For the execution of an adaptive regulation the desired values for the individual times are distributed in a load/turning rate performance graph. There, in principle, the definition for the load and turning-rate classes can be chosen at will, it being possible for the desired values to be stored in a fixed-value storer in an electronic gear control and regulating unit. Further, measuring arrangements are provided which determine the actual time in each shifting process up to the beginning of the synchronization process. As further influencing parameters there are taken into account the torque per load-giver position, the turning rate in the switching, as well as the mass inertia moment of the individual components. If the calculated actual value deviates from the desired value, a correction value is issued at the output of the control arrangement and becomes active on the pressure unit. The setting magnitude PR changes by the value of the correction.

The altered regulating pressure value is stored and is the output magnitude in a renewed switching. Other concepts of the adaption of the regulating pressure value are likewise conceivable. For example, also the correction value can be a permanently prescribed one, which is permanently stored or else is established as mean value of a large number of deviations. Further, there is present the possibility of continual calculation.

The desired value to be observed for the shifting process is, in the case of a so-called initial pressure value adaption, preferably the time up to the beginning of the synchronization process $t_{UREAL}$. Other time frames are likewise thinkable. The setting member or the setting magnitude for the influencing of this time span is the initial pressure value PA. For the execution of an adaptive regulation the desired values are entered, for the time up to the beginning of the synchronization process $t_{UREAL}$, for example, in a load/turning-rate performance graph. There in principle the definition for the load and turning-rate classes can be chosen arbitrarily, it being possible for the desired values to be stored in a fixed-value storer in an electronic gear control unit. Further, measuring arrangements are provided which determine the actual time in each shifting process, up to the beginning of the synchronization process. As further influencing parameters there are taken into account the torque per load-giver position, the turning rate in the switching as well as the mass inertia moment of the individual components, and the gear temperature. If the determined actual value deviates from the desired value, a correction value is issued at the output of the control arrangement and it becomes active on the pressure unit. The setting magnitude PA changes by the value of the correction. The altered initial pressure value is stored. The correction value can be there, for example, an established invariable value, a mean value formed or to be formed from the deviations of a number of shifting processes or it can be a value calculated for each individual shifting process or for selected shifting processes. A large number of possibilities are conceivable, which lie within the capability of the worker in the field, for which reason all of them do not need to be mentioned individually and explained.

Further, there is the possibility of conceiving the shifting device in such manner that, besides the initial pressure value, also the regulating pressure is adapted, and therewith the possible slip time can be influenced. In this case it can be established that the individual pressure value adaption has priority over the regulating pressure adaption. Another allocation of the values between initial and regulating-pressure adaption is likewise thinkable. A change in the setting magnitudes by a fixed correction value is possible either by addition or by multiplication.

Other concepts of the adaptation of the time up to the beginning of the synchronization process by changing the initial pressure value are likewise thinkable.

In FIGS. 1a and 1b, it is represented in dot-and-dashed lines that despite completed adaption of the control pressure shift characteristic curves, which theoretically should characterize an optimated shifting behavior, deviations occur with respect to the desired course of the characteristic curve II' for the turning rate $n_1$ to be synchronized on the drive side, by means of external influences outside of the adaption concept. In particular it is a matter there of a deviating from the desired acceleration of the turning rate to be synchronized. This has the consequence that the drive turning rate $n_1$ is adapted substantially more slowly to the off-drive turning rate $n_2$ that essentially is not changing, and is synchronized with this. This results in a poorer shifting behavior; in detail the shifting time is lengthened. In particular the increasing of the drive turning rate, i.e. of the turning rate $n_1$ to be synchronized with the off-drive turning rate $n_2$ in the time span between $T_{MAX}$ and $T_{shifting\ end}$, leads to undesired shifting jolts, which are registered as jolts in the vehicle. A further correction by adaptive measures is not sensible then, since the adaptively established desired shifting characteristic curves would contain a change which theoretically would condition a poorer shifting behavior than before alteration of the characteristic curves.

For the avoidance of this occasionally occurring effect, therefore, according to the invention a regulating arrangement is provided. This becomes active when the adaption does not insure any optimal shifting course. The regulating arrangement controls the behavior of the turning rate $n_1$ to be synchronized on the drive side. If the turning rate $n_1$ to be synchronized decreases in a manner such that it does not rise in the desired manner with respect to the off-drive turning rate $n_2$, i.e. if the acceleration of this turning rate deviates by a certain value, the regulating arrangement is activated. The earliest time point of the activation of the regulating arrangement is the beginning of the slippage of the friction element, but always a time $>t_{UTEAL}$.

The regulating arrangement essentially processes at least two magnitudes—an actual value or a magnitude characterizing at least indirectly the acceleration of the drive turning rate, and a desired value of this magnitude, which is preferably the drive turning rate itself, it being possible to determine the acceleration over the time from the detected turning rates. The starting magnitude of the regulating arrangement is a change of the control pressure acting on the lamellae of the coupling. As setting member there functions, for example, a control pressure generating unit. Within the regulating stretch there occurs a steady comparison of the actually determined current acceleration of the drive turning rate with a drive turning rate course determined theoretically with a corresponding control pressure course. On deviation, a setting signal is issued for the influencing of the control pressure, especially for its increase. Preferably this increase occurs by an establishable and prescribable or determined increase value. FIG. 1b explains the influence of the regulation on the actual course of the turning rate to be synchronized in the characteristic curve II. From this it is evident that a steeper rise of the acceleration is achieved with respect to the state of the art (characteristic curve II') and the turning rate to be synchronized reach the synchronous turning rate far earlier (FIG. 2) and therewith the synchronous time is shortened.

Figure 2A:
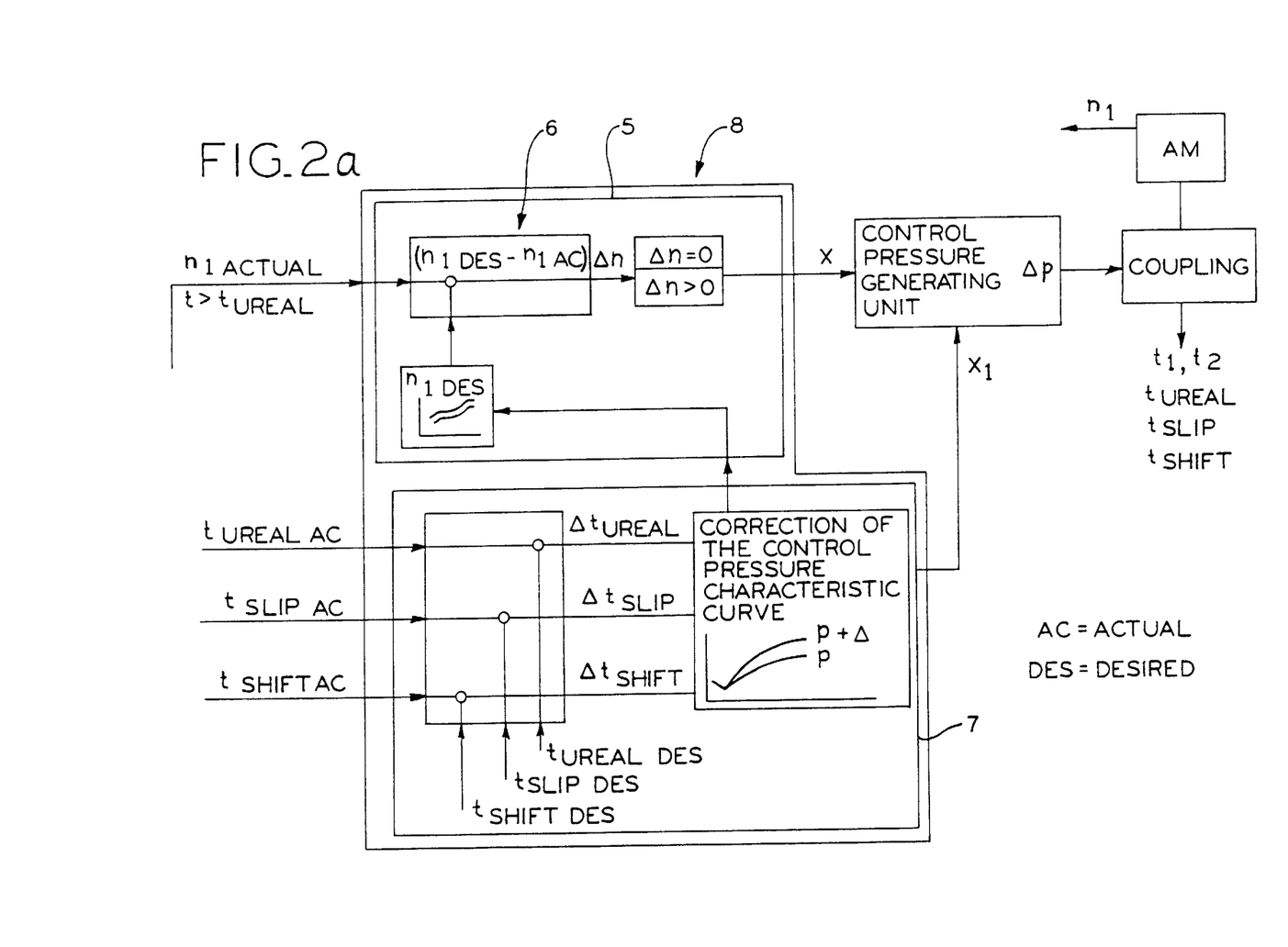
FIGS. 2a and 2b schematically clarify possibilities of the conversion according to the device.

In respect to the apparatus, the control device allocated to the gear, as represented in FIG. 2a, has a regulating arrangement, preferably in the form of an electronic control and regulating arrangement 5. This has at least one input which is coupled with a detection arrangement for detecting the actual turning rate. The detection of the actual turning rate occurs there at least a time point $t>t_{UREAL}$. Into the regulating arrangement, a comparator 8 is integrated. The comparator can be executed by routines running off in the control and regulating unit. By the comparator, for example, desired values n1 desired, entered there in the form of characteristic curves for theoretical drive turning-rate courses, are compared, during a shifting process, with the actual values. The comparison can also extend to a prescribable desired-value range.

On deviation, i.e. delta, the control pressure is changed, for example, by an establishable and prescribable value. For this value, it can be a matter of a fixed magnitude; theoretically there exists also the possibility of calculating this correction value. In correspondence the correction value delta p, a setting magnitude X is issued for the drive of the control pressure generating unit, at the output of the control or regulating arrangement. The alteration of the magnitude of the control pressure for the actuation of the coupling influences the drive turning rate $n_1$ of the drive machine AM, or the characteristic curve course II corresponding to FIG. 1b.

The regulating arrangement can also be, for example, a component of a central control and regulating device 8, which is allocated to the gear and comprises a control or regulating arrangement 7 for the pressure value adaption. The control or regulating arrangement 7 comprises there at least one input for the detection of at least one magnitude characterizing the shifting process. This magnitude can be, for example, $t_{UREAL}$ or $t_{Slip}$, or actual ' shifting. It is possible, however, also for several of these magnitudes to be detected in parallel. For the influencing of these time spans, there occurs then an adaptive change of the control pressure of the initial control pressure and/or of the regulating pressure. For this a setting magnitude X1 is issued for the drive of the control-pressure generating unit. In this case the characteristic curve for the theoretical course of the turning rate to be synchronized can constantly be actualized anew, in dependence on the adapted control pressure courses.

In construction, the control and regulating arrangement are preferably the same.

Figure 2B:
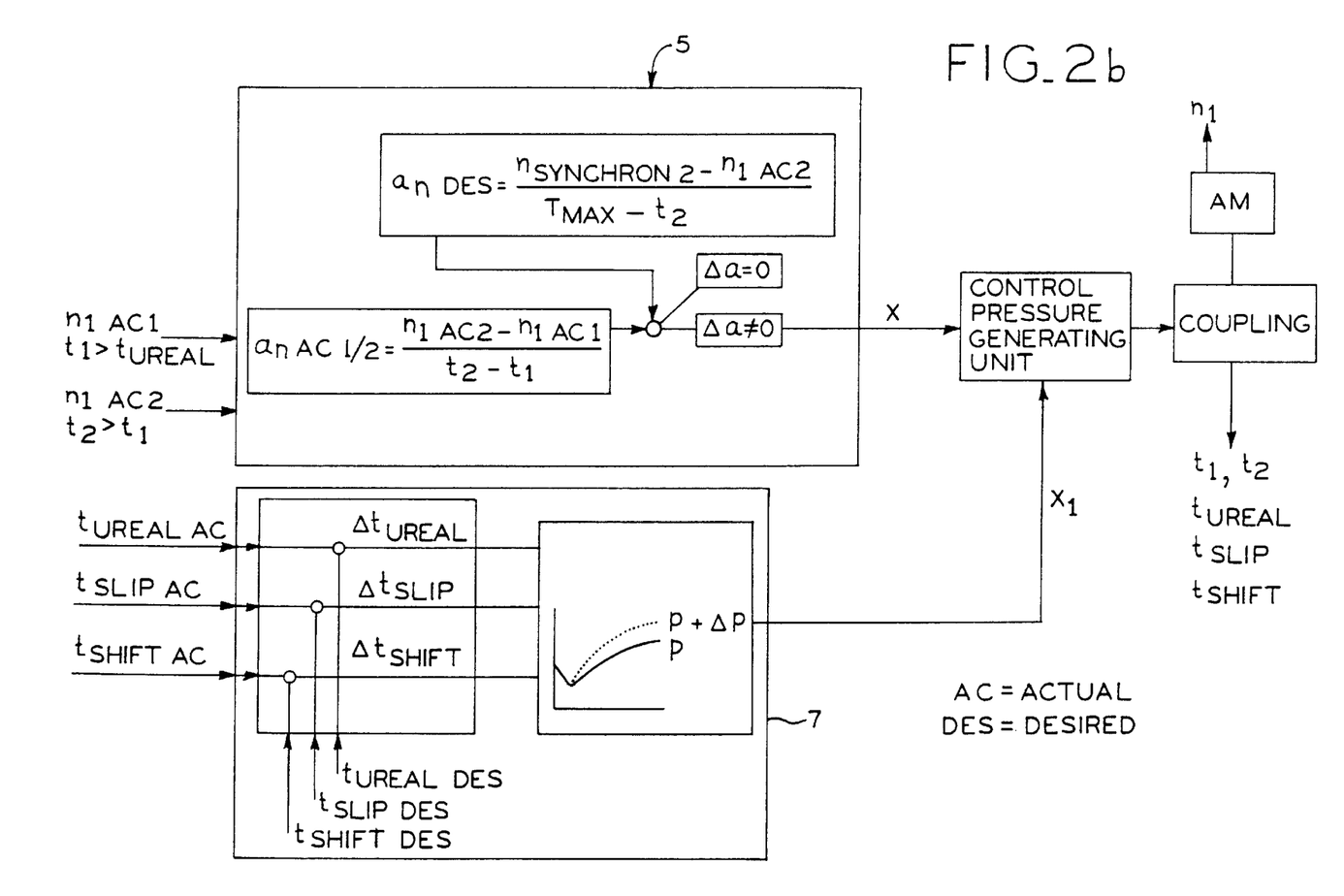

Another possibility, represented in FIG. 2b, involves the calculation of the drive turning rate courses. For this the required desired-drive turning rate or its course, can be calculated directly or else, as represented in FIG. 2b, its desired acceleration $a_{n\ desired}$. For this, too, a control or regulating arrangement 5 is provided. This has at least one input for the detection of the actual turning rates at different points in time, $t_{1>}$, UREAL, $t_2 > t_1$. From these, then, there can be determined the actual acceleration of the drive turning rate $a_{n\ actual\ \frac{1}{2}}$. Further, in dependence on the detected turning rates, the desired acceleration $a_{n\ desired}$ is determined. The two magnitudes are compared with one another, in which operation, on deviation, a setting magnitude X is issued for the drive of the control pressure generating unit. The control pressure is increased there by a given value delta p. This increased value can be either permanently prescribed or variable. To the setting magnitude X for this there can be assigned a fixed value, it can always be calculated anew in correspondence to the amount of a desired pressure increase. In this case, too, the control and regulating arrangement 5 can be comprised with the control or regulating arrangement 7 for the adaptive influencing of the control pressure courses in a central control and regulating unit. In this case the functions of the adaption and the regulation superposed on this are taken over by one and the same control or regulating apparatus.

An integration of the control or regulating arrangement into the central vehicle control is possible.

What is claimed is:

1. A method for controlling a shifting process of an automatic vehicle gear with electro-hydraulically actuated friction elements for shifting a transmission between different transmission stages, in a vehicle with at least one drive machine in which in each gear shifting process an actual value is determined for at least one magnitude characterizing the shifting process;

said actual value is compared with a desired value;

on deviation of said actual value from said desired value a control pressure for actuating the electro-hydraulic actuated friction elements, which influences at least one magnitude characterizing the shifting process, is changed adaptively by a first correction value to achieve an optimal shifting behavior, and a course of the influenced magnitude is stored in each case as a new characteristic curve of the desired value, wherein the method comprises:

when by further adaption a satisfactory shifting process can no longer be performed, at least one actual value is determined of a magnitude characterizing an acceleration of a drive turning rate to be synchronized, said actual value of the magnitude characterizing the acceleration of the drive turning rate to be synchronized is compared with a desired acceleration value;

on deviation of said actual value from said desired acceleration value, said control pressure is changed by a second correction value until a desired value course of said drive turning rate to be synchronized is set in, and otherwise a course of a control pressure characteristic curve is imitated with higher pressures.

2. The method according to claim 1, wherein said desired value of said drive turning rate to be synchronized is calculated at the time point of the determination of the deviation.

3. The method according to claim 1, wherein said desired value of said drive turning rate to be synchronized for certain control pressure courses are entered in characteristic curves.

4. The method according to claim 3, wherein said desired value of said drive turning rate to be synchronized are redetermined after each completed adaption.

5. The method according to claim 1, wherein said desired value of said drive turning rate to be synchronized for any control pressure courses are entered in a table.

6. The method according to claim 5, wherein the desired values of the turning rate to be synchronized are redetermined after each completed adaption.

7. The method according to claim 1, wherein said second correction value is prescribable and invariable in its magnitude.

8. The method according to claim 1, wherein said second correction value is calculated continuously as a function of the deviation of said actual and desired values.

9. The method according to claim 1, wherein:

in each shifting process there is determined at least one of the magnitudes listed below characterizing the shifting process:

the time duration of slipping of a lamellae;

the time duration from beginning of the synchronizing process until its end;

the time duration until the end of the shifting process; and, the time duration from beginning of the shifting process until a time point of beginning of the a safety uptake;

as a first actual value, or the change of the drive turning rate during this time duration as a second actual value of the magnitude characterizing the shifting process;

on deviation of the actual values from the prescribed desired values, or on non-attainment of the prescribed drive turning rate change, a regulating control pressure value is adapted.

10. The method according to claim 9, wherein the initial control pressure value or the regulating control pressure is altered successively by the first correction value.

11. The method according to claim 10, wherein the alteration of the initial control pressure value or of the regulating control value occurs in each case by a fixed first correction value, and the altered initial or regulating control pressure value is stored for like border conditions.

12. The method according to claim 10, wherein the first correction value for the change of the initial or of the regulating control pressure, is calculated in each shifting process.

13. The method according to claim 9, wherein the alteration of the initial control pressure value or of the regulating control value occurs in each case by a fixed first correction value, and the altered initial or regulating control pressure value is stored for like border conditions.

14. The method according to claim 13, wherein the first correction value for the change of the initial or of the regulating control pressure, is calculated in each shifting process.

15. The method according to claim 9, wherein the first correction value for the change of the initial or of the regulating control pressure is calculated in each shifting process.

16. The method according to claim 15, wherein over a plurality of shifting processes the first correction value is determined, and its mean value is stored in each case at least briefly as fixed correction value.

17. The method according to claim 1, wherein:
in each shift process there is determined a time span between the giving of a gear shifting signal and the beginning of the synchronization process or the change of the drive turning rate during this time duration as a first or second actual value of the magnitude characterizing the shifting process;
on deviation of the time duration up to the beginning of the synchronizing process from the prescribed desired time span or on non-attainment of the prescribed drive turning rate change after a shifting process, the initial control pressure value is adapted for the bringing-up of the requisite pressure force of coupling parts couplable with force closure.

18. The method according to claim 17, wherein the adaption of the regulating control pressure value takes precedence over the adaption of the initial control pressure value.

19. The method according to claim 18, wherein the initial control pressure value or the regulating control pressure is altered successively by said first correction value.

20. The method according to claim 18, wherein the alteration of the initial control pressure value or of the regulating control value occurs in each case by a fixed first correction value, and the altered initial or regulating control pressure value is stored for like border conditions.

21. The method according to claim 18, wherein the first correction value for the change of the initial or of the regulating control pressure, is calculated in each shifting process.

22. The method according to claim 17, wherein the adaption of the initial control pressure value takes precedence over adaption of the regulating control pressure.

23. The method according to claim 22, wherein the initial control pressure value or the regulating control pressure is altered successively by said first correction value.

24. The method according to claim 22, wherein the alteration of the initial control pressure value or of the regulating control value occurs in each case by a fixed first correction value, and the altered initial or regulating control pressure value is stored for like border conditions.

25. The method according to claim 22, wherein the first correction value for the change of the initial or of the regulating control pressure, is calculated in each shifting process.

26. The method according to claim 17, wherein the initial control pressure value or the regulating control pressure is altered successively by said first correction value.

27. The method according to claim 17, wherein the alteration of the initial control pressure value or of the regulating control value occurs in each case by a fixed first correction value, and the altered initial or regulating control pressure value is stored for like border conditions.

28. The method according to claim 17, wherein the first correction value for the change of the initial or of the regulating control pressure, is calculated in each shifting process.

29. A control device for controlling a vehicle gear with at least one arrangement for the bringing-up of the force required for the shifting between two different transmission stages for a vehicle with at least one drive machine, by means of a pressure medium;
a control arrangement with at least one first input and one first output;
at least one detection arrangement for the determination of an actual value characterizing the shifting process;
a setting member of the control arrangement is formed by the arrangement for the generation of a press-on force and is coupled with the output of the control arrangement;
the control arrangement comprises at least one comparison arrangement for comparison of the actual value with a fixable and stored desired value;
the control arrangement comprises an arrangement changing a setting magnitude by a fixable correction value for at least indirect influencing, on deviation of the actual value from the desired value;
the control arrangement comprises a storage arrangement for storing the setting magnitude altered by the correction value for the desired value to be achieved;
wherein:
there is provided a regulating arrangement comprising at least one input and one output;
the first input of the regulating arrangement is coupled with an arrangement for the detection either of the acceleration of the turning rate to be synchronized or of a magnitude at least indirectly characterizing the acceleration of the turning rate to be synchronized, or that of the turning rate to be synchronized;
the regulating arrangement comprises an arrangement for the comparison of the actual value with a prescribable or calculatable desired value;
the output is connected to an arrangement for changing a setting value at least indirectly by a correction value, on deviation of the actual value from the desired value;
the setting magnitude is the regulating control pressure; and,
the regulating arrangement is coupled with the control arrangement in such manner that the regulating arrangement is activated only on exhaustion of the possibilities of the adaption.

30. The control device according to claim 29, wherein the detection arrangement is a turning rate sensor for the determination of the turning rate to be synchronized.

31. The control device according to claim 29, wherein the arrangement for changing the setting magnitude of the control arrangement and the arrangement for changing the setting, magnitude of the regulating arrangement, is the arrangement for the generation of the control pressure to be acting on the coupling.

32. The control device according to claim 29, further comprising the following features:

the control arrangement has a further output which is coupled with an arrangement for determining the desired values of the turning rate to be synchronized from the control pressure characteristic curves adapted by means of the control arrangement; and, the arrangement for determining the desired values is coupled with the input of the regulating arrangement.

33. The control device according to claim 29, wherein the regulating arrangement has an arrangement for the calculation of the desired value of the turning rate to be synchronized or of the magnitude characterizing at least indirectly the turning rate to be synchronized, which actually calculates the desired value for each shifting process.

34. The control device according to claim 29, wherein essential parts of the control arrangement and of the regulating arrangement are formed by an electronic data processing unit.

35. The control device according to claim 29, wherein the control device is a component of a central vehicle control.

* * * * *

UNITED STATES PATENT AND TRADEMARK OFFICE
CERTIFICATE OF CORRECTION

PATENT NO.   : 6,134,496
DATED        : October 17, 2000
INVENTOR(S)  : E. Rotter et al.

It is certified that error appears in the above-identified patent and that said Letters Patent is hereby corrected as shown below:

<u>Column 4,</u>
Line 40, change "u" to -- $\mu$ --.

<u>Column 8,</u>
Line 59, change "nl desired" to -- $n_{1\ desired}$ --
Line 64, after "delta" add -- n --

<u>Column 9,</u>
Line 30, change "course,can" to -- course, can --.

Signed and Sealed this

Eighteenth Day of December, 2001

Attest:

Attesting Officer

JAMES E. ROGAN
Director of the United States Patent and Trademark Office